United States Patent
Hu et al.

(10) Patent No.: US 12,408,088 B2
(45) Date of Patent: Sep. 2, 2025

(54) INTER-SYSTEM HANDOVER METHOD AND COMMUNICATION APPARATUS

(71) Applicant: Huawei Technologies Co., Ltd., Shenzhen (CN)

(72) Inventors: Xingxing Hu, Shanghai (CN); Hongping Zhang, Shenzhen (CN); Wenjie Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 334 days.

(21) Appl. No.: 17/819,398

(22) Filed: Aug. 12, 2022

(65) Prior Publication Data

US 2022/0386186 A1 Dec. 1, 2022

Related U.S. Application Data

(63) Continuation of application No. PCT/CN2021/075718, filed on Feb. 7, 2021.

(30) Foreign Application Priority Data

Feb. 14, 2020 (CN) .......................... 202010093924.6

(51) Int. Cl.
 *H04W 36/00* (2009.01)
 *H04W 36/14* (2009.01)

(52) U.S. Cl.
 CPC ... *H04W 36/0061* (2013.01); *H04W 36/0022* (2013.01); *H04W 36/00698* (2023.05); *H04W 36/144* (2023.05)

(58) Field of Classification Search
 CPC ....... H04W 36/0061; H04W 36/00698; H04W 36/0022; H04W 36/144
 See application file for complete search history.

(56) References Cited

U.S. PATENT DOCUMENTS

| | | | |
|---|---|---|---|
| 10,834,772 B2 * | 11/2020 | Wang | H04W 76/11 |
| 10,999,885 B1 * | 5/2021 | Shih | H04W 36/0011 |
| 11,350,325 B2 * | 5/2022 | Purkayastha | H04W 76/27 |
| 11,356,918 B2 * | 6/2022 | Xu | H04W 48/16 |

(Continued)

FOREIGN PATENT DOCUMENTS

| | | |
|---|---|---|
| CN | 105848222 A | 8/2016 |
| CN | 108029053 A | 5/2018 |

(Continued)

OTHER PUBLICATIONS

Ericsson et al., "RAN UE ID", 3GPP TSG RAN WG3 #106, R3-197078, Reno, NV, US, Nov. 18-22, 2019, 4 pages.

(Continued)

*Primary Examiner* — Bailor C Hsu
(74) *Attorney, Agent, or Firm* — Slater Matsil, LLP

(57) ABSTRACT

This application provides an inter-system handover method and a communication apparatus, and may be applied to an inter-system handover scenario. In a handover process, a source access network device may provide a target access network device with an identity of a terminal device. When determining to add the source access network device as a secondary access network device, the target access network device may send, to the source access network device, a request message for adding a secondary access network device that carries the identity of the terminal device.

21 Claims, 7 Drawing Sheets

(56) References Cited

U.S. PATENT DOCUMENTS

| | | | |
|---|---|---|---|
| 11,452,157 B2* | 9/2022 | Laselva | H04W 76/15 |
| 11,589,262 B2* | 2/2023 | Wang | H04W 28/08 |
| 2015/0141015 A1* | 5/2015 | Zhang | H04W 36/0061 |
| | | | 455/436 |
| 2016/0286447 A1* | 9/2016 | Sharma | H04W 76/34 |
| 2017/0195935 A1 | 7/2017 | Xu et al. | |
| 2018/0035344 A1 | 2/2018 | Wang | |
| 2018/0160342 A1* | 6/2018 | Park | H04W 36/0007 |
| 2019/0253937 A1* | 8/2019 | Hsieh | H04W 36/0061 |
| 2019/0261233 A1 | 8/2019 | Duan et al. | |
| 2019/0289515 A1 | 9/2019 | Tamura et al. | |
| 2020/0053616 A1 | 2/2020 | Zhu et al. | |
| 2021/0007032 A1* | 1/2021 | Peng | H04W 36/008357 |
| 2021/0029597 A1* | 1/2021 | Xu | H04W 36/00222 |
| 2021/0250825 A1* | 8/2021 | Purkayastha | H04W 36/06 |
| 2024/0314679 A1* | 9/2024 | Li | H04W 48/18 |

FOREIGN PATENT DOCUMENTS

| | | |
|---|---|---|
| CN | 108617025 A | 10/2018 |
| CN | 109600805 A | 4/2019 |
| CN | 110651497 A | 1/2020 |
| EP | 1808029 B1 | 6/2009 |
| WO | 2015008616 A1 | 1/2015 |
| WO | 2019159136 A1 | 8/2019 |
| WO | 2020030676 A1 | 2/2020 |

OTHER PUBLICATIONS

Huawei, "Handover enhancement for dual connectivity", 3GPP TSG-RAN WG3 Meeting #89, R3-151413, Beijing, China, Aug. 24-28, 2015, 14 pages.

CMCC, "End marker handling for handover", 3GPP TSG RAN WG3 #NR Adhoc, R3-184172, Montreal, Canada, Jul. 2-6, 2018, 4 pages.

Samsung, "Support of handover without SeNB change", 3GPP TSG-RAN WG3 Meeting #889, R3-151541, Beijing, China, Aug. 24-28, 2015, 3 pages.

Nokia et al. (TP for data forwarding BL CR for TS 38.413), "Inter-system direct forwarding with shared SgNB/gNB", 3GPP TSG-RAN WG3#105bis, R3-195354, Chongqing, China, Oct. 14-18, 2019, 9 pages.

China Telecom et al., "Support of inter-RAT HO from SA to EN-DC in Rel-16", 3GPP TSG-RAN WG2 #108, R2-1914511, Reno, NV, US, Nov. 18-22, 2019, 4 pages.

3GPP TS 23.501 V16.3.0 (Dec. 2019), 3rd Generation Partnership Project; Technical Specification Group Services and System Aspects; System architecture for the 5G System (5GS); Stage 2 (Release 16), 417 pages.

Ericsson, "Support for inter-system MR DC HO (37.340)", 3GPP TSG-RAN WG2 Meeting #104, R2-1817748, Spokane, WA, US, Nov. 12-16, 2018, 7 pages.

China Telecom et al., "Stage 2 CR for Inter-RAT HO between NR to EN-DC in Rel-16", 3GPP TSG-RAN WG2 #108, R2-1916586, Reno, NV, US, Nov. 18-22, 2019, 4 pages.

3GPP TS 25.413 V15.0.0 (Jun. 2018), 3rd Generation Partnership Project; Technical Specification Group Radio Access Network; UTRAN Iu interface Radio Access Network Application Part (RANAP) signalling (Release 15), 455 pages.

Samsung, "Handover enhancement", 3GPP TSG-RAN WG3 #87, R3-150134, Athens, Greece, Feb. 9-13, 2015, 7 pages.

3GPP TS 36.300 V16.0.0 (Dec. 2019), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), 366 pages.

Nokia et al., "TP for Handover enhancement for dual connectivity", 3GPP TSG-RAN WG3 Meeting #87, R3-150398, Athens, Greece, Feb. 9-13, 2015, 6 pages.

3GPP TS 36.413 V16.0.0 (Dec. 2019), 3rd Generation Partnership Project; Technical Specification Group Radio Access Network; Evolved Universal Terrestrial Radio Access Network (E-UTRAN); S1 Application Protocol (S1AP) (Release 16), 390 pages.

3GPP TS 36.423 V16.0.0 (Dec. 2019), 3rd Generation Partnership Project; Technical Specification Group Radio Access Network; Evolved Universal Terrestrial Radio Access Network (E-UTRAN); X2 application protocol (X2AP) (Release 16), 432 pages.

3GPP TS 37.340 V16.0.0 (Dec. 2019), 3rd Generation Partnership Project; Technical Specification Group Radio Access Network; Evolved Universal Terrestrial Radio Access (E-UTRA) and NR; Multi-connectivity; Stage 2 (Release 16), 72 pages.

3GPP TS 38.300 V16.0.0 (Dec. 2019), 3rd Generation Partnership Project; Technical Specification Group Radio Access Network; NR; NR and NG-RAN Overall Description; Stage 2 (Release 16), 101 pages.

3GPP TS 38.413 V16.0.0 (Dec. 2019), 3rd Generation Partnership Project; Technical Specification Group Radio Access Network; NG-RAN; NG Application Protocol (NGAP) (Release 16), 335 pages.

3GPP TS 48.008 V15.0.0 (Jun. 2018), 3rd Generation Partnership Project; Technical Specification Group Radio Access Network; Mobile Switching Centre—Base Station System (MSC-BSS) interface; Layer 3 specification (Release 15), 239 pages.

3GPP TS 48.018 V15.0.0 (Jun. 2018), 3rd Generation Partnership Project; Technical Specification Group Radio Access Network; General Packet Radio Service (GPRS); Base Station System (BSS)—Serving GPRS Support Node (SGSN); BSS GPRS Protocol (BSSGP) (Release 15), 219 pages.

3GPP TS 38.401 V16.0.0 (Dec. 2019), 3rd Generation Partnership Project; Technical Specification Group Radio Access Network; NG-RAN; Architecture description (Release 16), 49 pages.

Nokia et al., "(TP for data forwarding BL CR for TS 38.413) Inter-system direct forwarding with shared SgNB/gNB", 3GPP TSG-RAN WG3#106, R3-196559, Reno, NV, USA, Nov. 18-22, 2019, 9 pages.

* cited by examiner

INTER-SYSTEM HANDOVER METHOD AND COMMUNICATION APPARATUS

CROSS-REFERENCE TO RELATED APPLICATIONS

This application is a continuation of International Patent Application No. PCT/CN2021/075718, filed on Feb. 7, 2021, which claims priority to Chinese Patent Application No. 202010093924.6, filed on Feb. 14, 2020. The disclosures of the aforementioned applications are hereby incorporated by reference in their entireties.

TECHNICAL FIELD

This application relates to the communication field, and more specifically, to an inter-system handover method and a communication apparatus.

BACKGROUND

In a wireless network, one terminal device may communicate with a plurality of access network devices. This is multi-radio dual connectivity (multi-radio dual connectivity, MR-DC). There are a plurality of types of dual connectivity, such as evolved universal terrestrial radio access (E-UTRA)-new radio dual connectivity (EN-DC).

Inter-system handover may be performed on a terminal. For example, the terminal is handed over from connecting to a 5th generation (5th generation, 5G) core network (5GC) by accessing a base station in a new radio access technology (NR) network to connecting to a 4th generation (4G) core network by accessing a base station in a long term evolution (LTE) network. In an inter-system handover scenario, some data packets sent by a source core network to a source access network device are forwarded to a target access network device in a target system. In a solution, the source access network device first forwards the data packets to the source core network in a source system, the source core network then forwards the data packets to a target core network in the target system, and the target core network then forwards the data packets to the target access network device. In another solution, the source access network device directly forwards the data packets to the target access network device. After the data packets are forwarded to the target access network device, the target access network device sends the data packets to the terminal device.

In a current technology, it is mentioned that during inter-system handover, the target access network device may configure the MR-DC for the terminal device. In this scenario, how to forward data becomes a technical problem that urgently needs to be resolved.

SUMMARY

This application provides an inter-system handover method and a communication apparatus, so that in a scenario in which a target secondary access network device is a source access network device, data corresponding to a bearer terminated at the source access network device is not forwarded, and then a delay caused by data forwarding can be avoided.

According to a first aspect, an inter-system handover method is provided. The method includes: A first access network device receives a handover request message from a first core network device, where the handover request message includes an identity of a terminal device, the first access network device provides the terminal device with a service for connecting to a first core network, and the first core network device belongs to the first core network. The first access network device determines that a secondary access network device to be added for the terminal device is a second access network device, where the second access network device provides the terminal device with a service for connecting to a second core network. The first access network device sends a request message for adding a secondary access network device to the second access network device, where the request message for adding a secondary access network device includes the identity of the terminal device.

Optionally, the identity of the terminal device is a cell radio network temporary identifier (C-RNTI) allocated to the terminal device in a serving cell that is of the second access network device and in which the terminal device is located; or the identity of the terminal device is an identity of the terminal device on an interface between the second access network device and a second core network device, where the second core network device belongs to the second core network.

The identity of the terminal device on the interface between the second access network device and the second core network device may be allocated by the second access network device, or may be allocated by the second core network device.

According to the method provided in this application, the second access network device may provide, in a handover process, the first access network device with the identity of the terminal device on which a handover procedure is to be performed. When determining that the secondary access network device and a source access network device (namely, the second access network device) are a same access network device, the first access network device provides the source access network device with the identity of the terminal device, so that the source access network device does not forward data corresponding to a bearer terminated at the source access network device, and then a data transmission delay can be reduced.

With reference to the first aspect, in some implementations of the first aspect, the handover request message may further include an identity of the second access network device.

Optionally, the first access network device may determine, based on the identity of the second access network device, that the secondary access network device to be added for the terminal device is the second access network device.

Optionally, the identity of the second access network device is an identity used when the second access network device provides the terminal device with the service for connecting to the first core network.

For example, the identity of the second access network device may include one or more of the following: a global base station identifier that is used when the second access network device provides the terminal device with the service for connecting to the first core network and that is of the second access network device, a frequency channel number that is used when the second access network device provides the terminal device with the service for connecting to the first core network and that is of a cell managed by the second access network device, a physical cell identifier (PCI) that is used when the second access network device provides the terminal device with the service for connecting to the first core network and that is of the cell managed by the second access network device, a PCI that is used when the second access network device provides the terminal device with the service for connecting to the first core network and that is of the serving cell that is of the second access network device and in which the terminal device is located, a frequency channel number that is used when the second access network device provides the terminal device with the service for connecting to the first core network and that is of the serving cell that is of the second access network device and in which the terminal device is located, and a cell global identifier (CGI) that is used when the second access network device provides the terminal device with the service for connecting to the first core network and that is of the serving cell that is of the second access network device and in which the terminal device is located.

Optionally, the identity of the second access network device is an identity used when the second access network device provides the terminal device with the service for connecting to the second core network.

For example, the identity of the second access network device may include one or more of the following: a global base station identifier that is used when the second access network device provides the terminal device with the service for connecting to the second core network and that is of the second access network device, a frequency channel number that is used when the second access network device provides the terminal device with the service for connecting to the second core network and that is of a cell managed by the second access network device, a PCI that is used when the second access network device provides the terminal device with the service for connecting to the second core network and that is of the cell managed by the second access network device, a PCI that is used when the second access network device provides the terminal device with the service for connecting to the second core network and that is of the serving cell that is of the second access network device and in which the terminal device is located, a frequency channel number that is used when the second access network device provides the terminal device with the service for connecting to the second core network and that is of the serving cell that is of the second access network device and in which the terminal device is located, and a CGI that is used when the second access network device provides the terminal device with the service for connecting to the second core network and that is of the serving cell that is of the second access network device and in which the terminal device is located.

For example, the identity used when the second access network device provides the terminal device with the service for connecting to the first core network may be the same as or different from the identity used when the second access network device provides the terminal device with the service for connecting to the second core network.

With reference to the first aspect, in some implementations of the first aspect, before the first access network device sends the request message for adding a secondary access network device to the second access network device, the method may further include: The first access network device receives a first mapping relationship from the second access network device, where the first mapping relationship is a mapping relationship between an identity used when the second access network device provides the terminal device with the service for connecting to the first core network and the identity used when the second access network device provides the terminal device with the service for connecting to the second core network. That the first access network device determines that a secondary access network device to be added for the terminal device is a second access network device includes: The first access network device determines, based on the identity of the second access network device and the first mapping relationship, that the secondary access network device to be added for the terminal device is the second access network device.

According to a second aspect, an inter-system handover method is provided. The method includes: A second access network device sends a first message to a second core network device, where the first message includes an identity of a terminal device, the second access network device provides the terminal device with a service for connecting to a second core network, the first message is used to request a first access network device to allocate a resource to the terminal device, and the first access network device provides the terminal device with a service for connecting to a first core network. The second access network device receives a request message for adding a secondary access network device from the first access network device, where the first access network device is a master access network device of the terminal device, the request message for adding a secondary access network device includes the identity of the terminal device, and the request message for adding a secondary access network device is used to request to add the second access network device as a secondary access network device of the terminal device. The second core network device belongs to the second core network.

Optionally, the identity of the terminal device is a C-RNTI allocated to the terminal device in a serving cell that is of the second access network device and in which the terminal device is located; or the identity of the terminal device is an identity of the terminal device on an interface between the second access network device and the second core network device.

The identity of the terminal device on the interface between the second access network device and the second core network device may be allocated by the second access network device, or may be allocated by the second core network device.

After the second access network device receives the request message for adding a secondary access network device, if the second access network device determines, based on the identity of the terminal device, that the terminal device is a terminal device that the secondary access network device is serving (in other words, before handover), the second access network device may skip forwarding of data corresponding to a bearer terminated at the second access network device. In other words, it is not required that the data corresponding to the bearer terminated at the second access network device be first sent by the second access network device to the second core network, then forwarded by the second core network to the first core network, and sent by the first core network to the second access network device.

It should be understood that bearers terminated at the second access network device may include a secondary cell group (SCG) bearer terminated at the second access network device, a split bearer terminated at the second access network device, and a master cell group (MCG) bearer terminated at the second access network device.

Therefore, according to the method provided in this application, the second access network device may provide, in a handover process, the first access network device with the identity of the terminal device on which a handover procedure is to be performed. When determining that the secondary access network device and a source access network device (namely, the second access network device) are a same access network device, the first access network device provides the source access network device with the identity of the terminal device, so that the source access network device does not forward data corresponding to a bearer terminated at the source access network device, and then a data transmission delay can be reduced.

With reference to the second aspect, in some implementations of the second aspect, the first message may further include an identity of the second access network device.

Optionally, the identity of the second access network device is an identity used when the second access network device provides the terminal device with the service for connecting to the first core network.

Optionally, the identity of the second access network device is an identity used when the second access network device provides the terminal device with the service for connecting to the second core network.

With reference to the second aspect, in some implementations of the second aspect, before the second access network device receives the request message for adding a secondary access network device from the first access network device, the method may further include:

The second access network device sends a first mapping relationship to the first access network device, where the first mapping relationship is a mapping relationship between an identity used when the second access network device provides the terminal device with the service for connecting to the first core network and the identity used when the second access network device provides the terminal device with the service for connecting to the second core network.

In this way, when the first access network device receives the identity used when the second access network device provides the terminal device with the service for connecting to the second core network, the first access network device may determine, based on the first mapping relationship, whether the secondary access network device is the second access network device.

With reference to the second aspect, in some implementations of the second aspect, the method may further include: The second access network device sends, to the first access network device, data corresponding to a bearer terminated at the first access network device.

It should be understood that the data includes data that the second access network device has received and/or is to subsequently receive from the second core network. The second access network device may directly send the data to the first access network device. Alternatively, the second access network device may first send the data to the second core network, then the second core network forwards the data to the first core network, and the first core network sends the data to the first access network device.

With reference to the second aspect, in some implementations of the second aspect, the method may further include: The second access network device maps, based on a mapping relationship between a quality of service (QoS) flow and an evolved universal terrestrial radio access network radio access bearer (E-RAB), a data packet that is of a QoS flow and that is received from the second core network to a data radio bearer (DRB) corresponding to an E-RAB applicable after handover, and sends the data packet.

With reference to the second aspect, in some implementations of the second aspect, the method may further include: performing, by the second access network device, data communication with the terminal device by using a key applicable before the handover, and performing data communication with the terminal device by using a key applicable after the handover (that is, serving as a key of the secondary access network device).

Based on this solution, data interruption in the handover process can be avoided.

According to a third aspect, an inter-system handover method is provided. The method includes: A second core network device receives a first message from a second access network device. The second core network device sends a relocation request message to a first core network device based on the first message. The first message includes an identity of a terminal device, and the first message is used to request a first access network device to allocate a resource to the terminal device. The relocation request message includes the identity of the terminal device. The second access network device provides the terminal device with a service for connecting to a second core network, and the first access network device provides the terminal device with a service for connecting to a first core network. The second core network device belongs to the second core network, and the first core network device belongs to the first core network.

In this application, the second core network device may send the identity of the terminal device to the first access network device by using the first core network device.

Therefore, according to the method provided in this application, the second access network device may provide, by using the first core network device and the second core network device in a handover process, the first access network device with the identity of the terminal device on which a handover procedure is to be performed. When determining that a secondary access network device and a source access network device (namely, the second access network device) are a same access network device, the first access network device provides the source access network device with the identity of the terminal device, so that the source access network device does not forward data corresponding to a bearer terminated at the source access network device, and then a data transmission delay can be reduced.

With reference to the third aspect, in some implementations of the third aspect, the relocation request message may include an identity of the second access network device.

According to a fourth aspect, an inter-system handover method is provided. The method includes: A first core network device receives a relocation request message from a second core network device, where the relocation request message includes an identity of a terminal device, a second access network device provides the terminal device with a service for connecting to a second core network, and a first access network device provides the terminal device with a service for connecting to a first core network. The first core network device sends a handover request message to the first access network device, where the handover request message includes the identity of the terminal device. The second core network device belongs to the second core network, and the first core network device belongs to the first core network.

Therefore, according to the method provided in this application, the second access network device may provide, by using the first core network device and the second core network device in a handover process, the first access network device with the identity of the terminal device on which a handover procedure is to be performed. When determining that a secondary access network device and a source access network device (namely, the second access network device) are a same access network device, the first access network device provides the source access network device with the identity of the terminal device, so that the source access network device does not forward data corresponding to a bearer terminated at the source access network device, and then a data transmission delay can be reduced.

With reference to the fourth aspect, in some implementations of the fourth aspect, the relocation request message may include an identity of the second access network device.

With reference to the fourth aspect, in some implementations of the fourth aspect, the handover request message may include the identity of the second access network device.

According to a fifth aspect, a communication apparatus is provided, and includes modules or units configured to perform the method according to any one of the first aspect or the second aspect and the possible implementations of the first aspect or the second aspect.

According to a sixth aspect, a communication apparatus is provided, and includes a processor. The processor is coupled to a memory, and may be configured to execute instructions in the memory, to implement the method according to any one of the first aspect or the second aspect and the possible implementations of the first aspect or the second aspect. Optionally, the communication apparatus further includes the memory. Optionally, the communication apparatus further includes a communication interface. The processor is coupled to the communication interface.

Optionally, the communication interface is a transceiver or an input/output interface.

Optionally, the transceiver may be a transceiver circuit. Optionally, the input/output interface may be an input/output circuit.

According to a seventh aspect, a communication apparatus is provided, and includes modules or units configured to perform the method according to any one of the third aspect or the fourth aspect and the possible implementations of the third aspect or the fourth aspect.

According to an eighth aspect, a communication apparatus is provided, and includes a processor. The processor is coupled to a memory, and may be configured to execute instructions in the memory, to implement the method according to any one of the third aspect or the fourth aspect and the possible implementations of the third aspect or the fourth aspect. Optionally, the communication apparatus further includes the memory. Optionally, the communication apparatus further includes a communication interface. The processor is coupled to the communication interface.

Optionally, the communication interface is a transceiver or an input/output interface.

Optionally, the transceiver may be a transceiver circuit. Optionally, the input/output interface may be an input/output circuit.

According to a ninth aspect, a processor is provided, and includes an input circuit, an output circuit, and a processing circuit. The processing circuit is configured to receive a signal through the input circuit, and transmit a signal through the output circuit, to enable the processor to perform the method according to any one of the first aspect to the fourth aspect and the possible implementations of the first aspect to the fourth aspect.

In a specific implementation process, the processor may be a chip, the input circuit may be an input pin, the output circuit may be an output pin, and the processing circuit may be a transistor, a gate circuit, a trigger, various logic circuits, and the like. The input signal received through the input circuit may be received and input by, for example, but not limited to, a receiver, the signal output through the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to a tenth aspect, a processing apparatus is provided, and includes a processor and a memory. The processor is configured to read instructions stored in the memory, and may receive a signal through a receiver, and transmit a signal through a transmitter, to perform the method according to any one of the first aspect to the fourth aspect and the possible implementations of the first aspect to the fourth aspect.

Optionally, there are one or more processors, and there are one or more memories.

Optionally, the memory may be integrated with the processor, or the memory and the processor are disposed separately.

In a specific implementation process, the memory may be a non-transitory (non-transitory) memory, for example, a read-only memory (read-only memory, ROM). The memory and the processor may be integrated on a same chip, or may be separately disposed on different chips. A type of the memory and a manner of disposing the memory and the processor are not limited in this embodiment of this application.

It should be understood that a related information exchange process may be a process of outputting information from the processor, and receiving information may be a process of receiving information by the processor. Specifically, the information output by the processor may be output to the transmitter, and the input information received by the processor may be from the receiver. The transmitter and the receiver may be collectively referred to as a transceiver.

The processing apparatus in the tenth aspect may be a chip. The processor may be implemented by hardware or software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to an eleventh aspect, a computer program product is provided. The computer program product includes a computer program (which may also be referred to as code or instructions). When the computer program is run, a computer is enabled to perform the method according to any one of the first aspect to the fourth aspect and the possible implementations of the first aspect to the fourth aspect.

According to a twelfth aspect, a computer-readable medium is provided. The computer-readable medium stores a computer program (which may also be referred to as code or instructions). When the computer program is run on a computer, the computer is enabled to perform the method according to any one of the first aspect to the fourth aspect and the possible implementations of the first aspect to the fourth aspect.

According to a thirteenth aspect, a communication system is provided, and includes at least two of the first access network device, the second access network device, the first core network device, and the second core network device.

DETAILED DESCRIPTION OF ILLUSTRATIVE EMBODIMENTS

Figure 1:
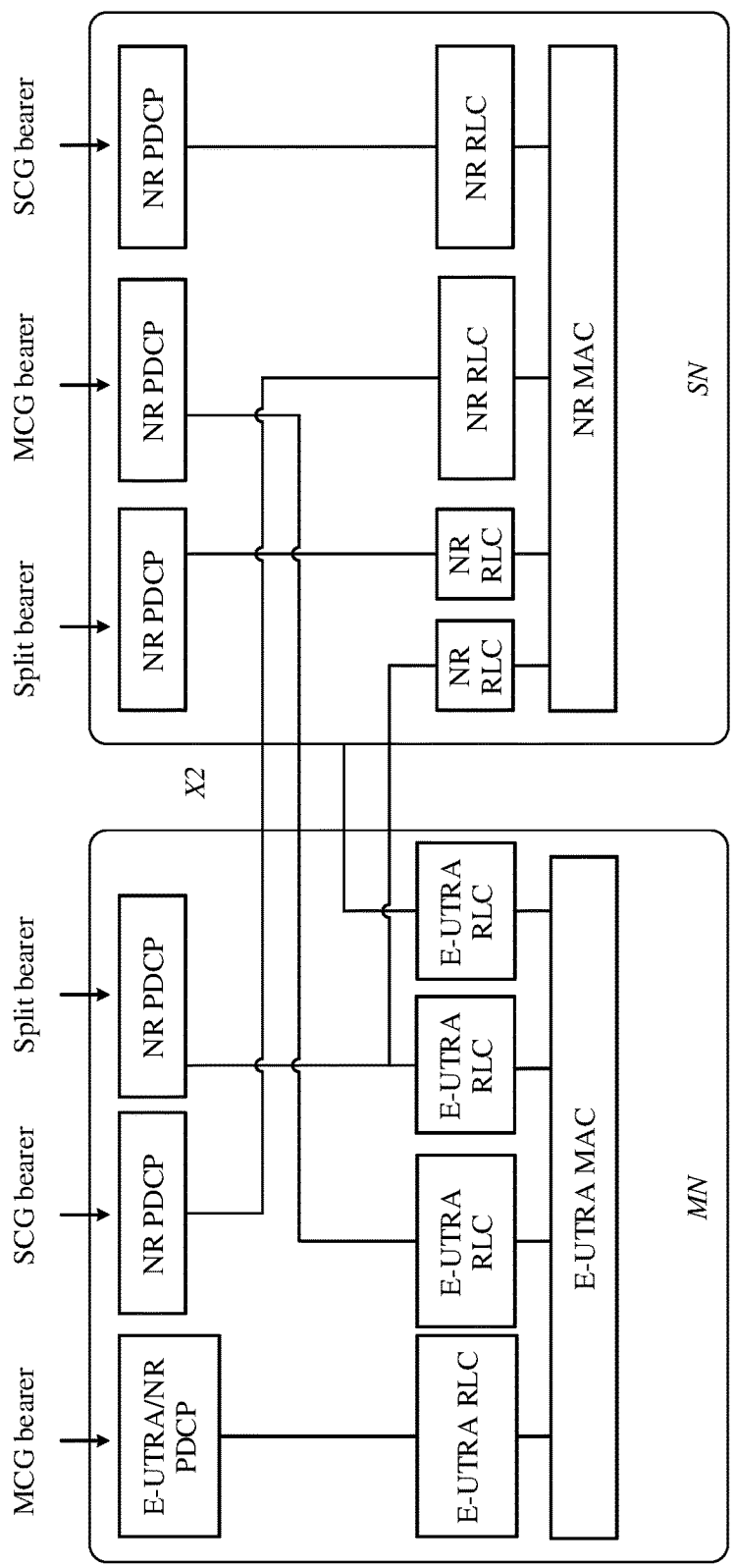
FIG. 1 is a schematic diagram of a user plane protocol stack.

The following describes technical solutions in this application with reference to accompanying drawings.

In a wireless network, one terminal device may communicate with a plurality of access network devices. That is, the terminal device may perform dual connectivity (DC) communication. In a DC scenario, a standard of a master access network device and a standard of a secondary access network device or a radio access technology (RAT) used by the master access network device and a radio access technology used by the secondary access network device may be the same or different.

Multi-radio dual connectivity (MR-DC) is a type of DC. Access network devices in the MR-DC include a master access network device and a secondary access network device that use different RATs or a same RAT. The master access network device is an access network device that is in the MR-DC and that exchanges control plane signaling with a core network, and another access network device in the MR-DC is the secondary access network device. Generally, the master access network device is also referred to as a master node (master node, MN), and the secondary access network device is also referred to as a secondary node (secondary node, SN).

There are a plurality of types of the MR-DC, for example, evolved universal terrestrial radio access (E-UTRA)-new radio dual connectivity (EN-DC), next generation radio access network (NG-RAN) evolved universal terrestrial radio access-new radio dual connectivity (NGEN-DC), new radio-evolved universal terrestrial radio access dual connectivity (NE-DC), and new radio-new radio dual connectivity (NR-DC).

In the EN-DC, a master access network device and a secondary access network device provide a terminal device with a service for connecting to a 4th generation (4G) core network. The 4G core network may be referred to as an evolved packet core (EPC). In addition, the master access network device is a long term evolution (LTE) access network device, and is also referred to as an evolved NodeB (eNB). The secondary access network device is an NR access network device, and is also referred to as a gNB. The EN-DC is sometimes also referred to as a non standalone (NSA). In an EN-DC network, the terminal device cannot camp on an NR cell. An NR access network device that the terminal device can camp on is sometimes also referred to as a standalone (SA) NR access network device.

In the NGEN-DC, a master access network device and a secondary access network device provide a terminal device with a service for connecting to a 5th generation (5G) core network (5GC). In addition, the master access network device is an LTE access network device, and the secondary access network device is an NR access network device.

In the NE-DC, a master access network device and a secondary access network device provide a terminal device with the service for connecting to the 5GC. In addition, the master access network device is an NR access network device, and the secondary access network device is an LTE access network device.

In the NR-DC, a master access network device and a secondary access network device provide a terminal device with the service for connecting to the 5GC. In addition, both the master access network device and the secondary access network device are NR access network devices.

It should be understood that, in this application, that an access network device provides a terminal device with a service for connecting to the EPC means that data plane transmission between the terminal device and the EPC is performed through the access network device. That an access network device provides a terminal device with the service for connecting to the 5GC means that data plane transmission between the terminal device and the 5GC is performed through the access network device.

It should be noted that, when the eNB provides UE with the service for connecting to the 5GC, the eNB is also referred to as an ng-eNB. When the gNB provides the UE with the service for connecting to the EPC, the gNB is also referred to as en-gNB. In the MR-DC, access network devices have different radio link control (RLC)/medium access control (MAC) entities. In the MR-DC, data radio bearers (DRB) are classified into a master cell group (MCG) bearer (bearer), a secondary cell group (SCG) bearer, and a split bearer. The MCG bearer means that an RLC/MAC entity of the DRB exists only on the master access network device. The SCG bearer means that an RLC/MAC entity of the DRB exists only on the secondary access network device. The split bearer means that RLC/MAC entities of the DRB exist on both the master access network device and the secondary access network device. A bearer for which a packet data convergence protocol (packet data convergence protocol, PDCP) is terminated at the master access network device is referred to as an MN terminated bearer. For the MN terminated bearer, downlink data directly arrives at the master access network device from a core network, and is sent to a terminal device through the RLC/MAC after being processed by using the PDCP/a service data adaptation protocol (SDAP) of the master access network device; and uplink data is sent to the core network after being processed through the PDCP/SDAP of the master access network device. A bearer for which a PDCP is terminated at the secondary access network device is referred to as an SN terminated bearer. For the SN terminated bearer, downlink data directly arrives at the secondary access network device from the core network, and is sent to the terminal device through the RLC/MAC after being processed through the PDCP/an SDAP of the secondary access network device; and uplink data is sent to the core network after being processed through the PDCP/SDAP of the secondary access network device.

FIG. 1 shows a user plane protocol stack of EN-DC on a network side and a user plane protocol stack of MR-DC with a 5GC on the network side. It should be understood that transmission on each bearer needs to be performed through RLC/MAC and a PDCP/an SDAP.

Figure 2:
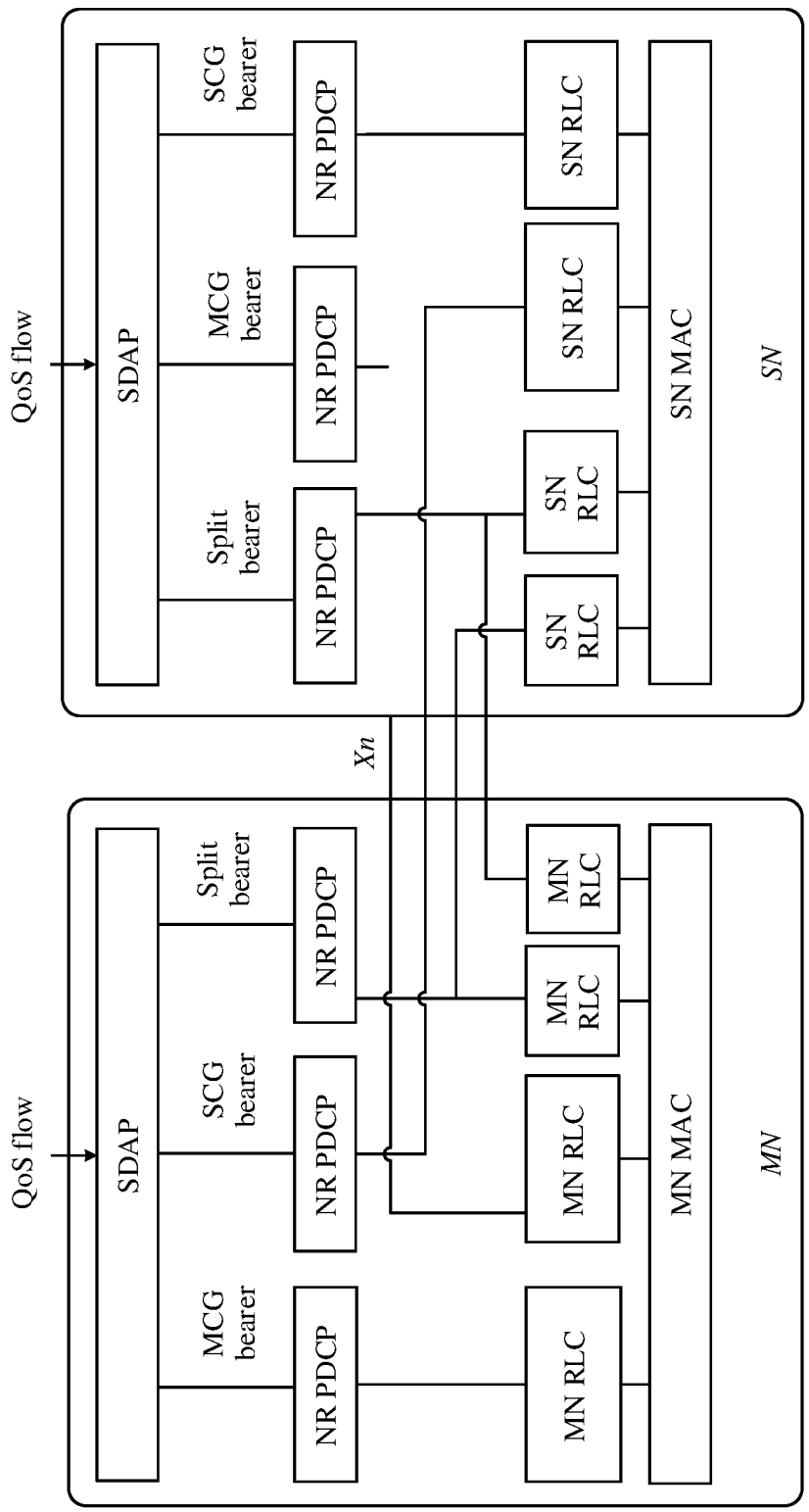
FIG. 2 is a schematic diagram of a protocol stack of an MCG bearer, an SCG bearer, and a split bearer.

FIG. 2 is a schematic diagram of a protocol stack of an MCG bearer, an SCG bearer, and a split bearer on a network side in NGEN-DC/NE-DC/NR-DC.

The solutions in this application are applicable to inter-system handover from non MR-DC (non MR-DC) to MR-DC. In other words, before the handover, a terminal device accesses a core network through only one access network device. After the handover, the terminal device accesses a core network in a DC manner. In addition, the core network before the handover is different from the core network after the handover. For example, one core network is an EPC, and the other core network is a 5GC.

Figure 3:
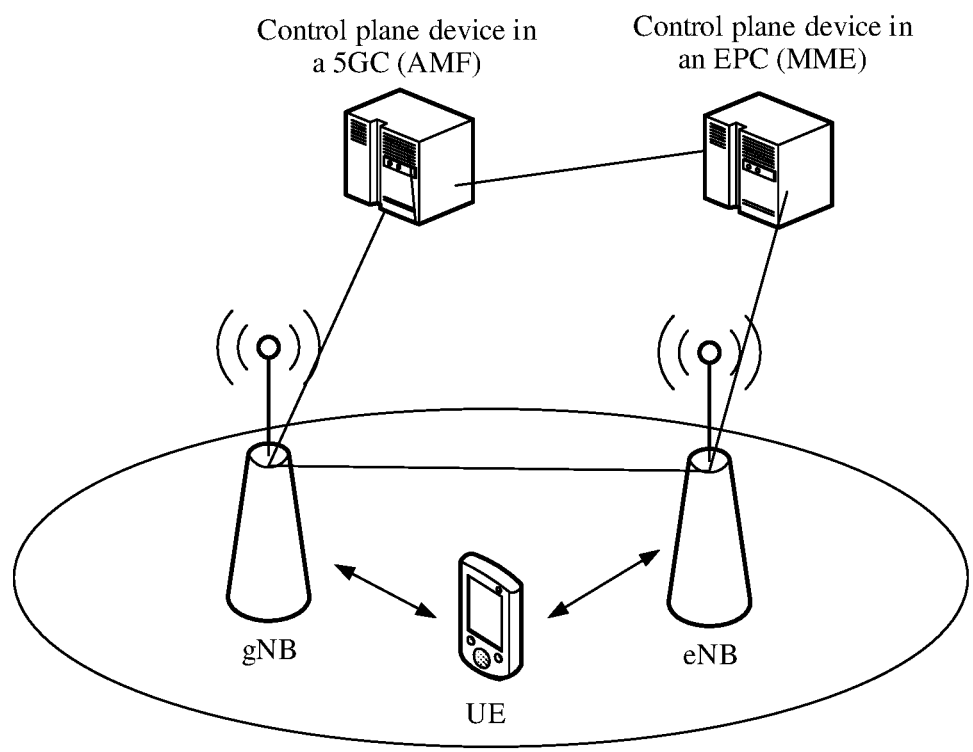
FIG. 3 is a schematic diagram of a system architecture to which this application is applied.

FIG. 3 is a schematic diagram of a communication scenario to which this application is applied. The scenario shown in FIG. 3 is inter-system handover from NR to EN-DC. In FIG. 3, before the handover, a gNB provides UE with a service for connecting to a 5GC. After the handover, the gNB and an eNB provide the UE with a service in a DC manner. The eNB is a master access network device of the UE, and the gNB is a secondary access network device of the UE. In addition, after the handover, the gNB and the eNB provide the UE with a service for connecting to an EPC.

It should be understood that, in this application, an access network device is an apparatus that is deployed in a radio access network to provide a terminal device with a wireless communication function. For example, an access network device in a 4G network, namely, an LTE access network device, includes but is not limited to an evolved NodeB (eNB), a radio network controller (RNC), a NodeB (NB), a base station controller (BSC), a base transceiver station (BTS), a home base station (for example, Home evolved NodeB, or Home NodeB, HNB), a baseband unit (BBU), and an access point (AP) in a wireless fidelity (Wi-Fi) system, a wireless relay node, a wireless backhaul node, a transmission point (TP), or a transmission reception point (TRP). For another example, an access network device in a 5G network, namely, an NR access network device, includes but is not limited to a gNB, a transmission point (TRP or TP), and one or one group of (including a plurality of antenna panels) antenna panels of a gNodeB in a 5G system. Alternatively, an access network device in a 5G network may be a network node applied in a gNB or a transmission point, for example, a baseband unit (BBU), a distributed unit (DU), a radio controller in a cloud radio access network (CRAN) scenario, a wearable device, or a vehicle-mounted device.

In some deployments, the gNB may include a centralized unit (CU) and the DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer. The DU implements functions of a radio link control (RLC) layer, a media access control (MAC) layer, and a physical (PHY) layer. Information at the RRC layer eventually becomes information at the PHY layer, or is converted from information at the PHY layer. Therefore, in this architecture, higher layer signaling such as RRC layer signaling may also be considered as being sent by the DU or by the DU and the CU. It may be understood that the network device may be a CU node, a DU node, or a device including the CU node and the DU node. In addition, the CU may be classified as a network device in an access network (RAN), or may be classified as a network device in a core network (CN). This is not limited in this application.

It should be further understood that, in this application, a control plane device in an EPC may be a mobility management entity (MME), or may be an entity having an MME function. A control plane device in a 5GC may be an access and mobility management entity (AMF), or may be an entity having the AMF function.

It should be further understood that the terminal device in this application may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet (pad), a computer having a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

In a current technology, for example, in the scenario shown in FIG. 3, after the handover, even a data packet corresponding to a bearer terminated at the gNB needs to be forwarded to the gNB again. This causes a data transmission delay.

To resolve the foregoing problem, this application provides an inter-system handover method. The following describes the solutions in this application.

Before the solutions in this application are described, a first access network device, a second access network device, a first core network device, and a second core network device are first described.

Before a terminal device is handed over, the second access network device provides the terminal device with a service for connecting to a second core network. After the terminal device is handed over, the second access network device provides the terminal device with a service for connecting to a first core network, and the first access network device provides the terminal device with the service for connecting to the first core network.

The first core network device is a control plane device in the first core network, and the second core network device is a control plane device in the second core network.

For example, the first core network may be an EPC, and the second core network may be a 5GC. In this case, for example, the first access network device, the second access network device, the first core network device, and the second core network device may respectively correspond to the eNB, the gNB, the control plane device in the EPC, and the control plane device in the 5GC in the scenario shown in FIG. 3.

For another example, the second core network may be an EPC, and the first core network may be a 5GC. For another example, the first core network may be a 5GC, and the second core network may be a future 6G core network.

The first core network device and the second core network device may be completely different, or may have some same functions.

It should be understood that FIG. 3 is merely an example scenario applicable to this application. This application may alternatively be applied to another scenario.

Figure 4A:
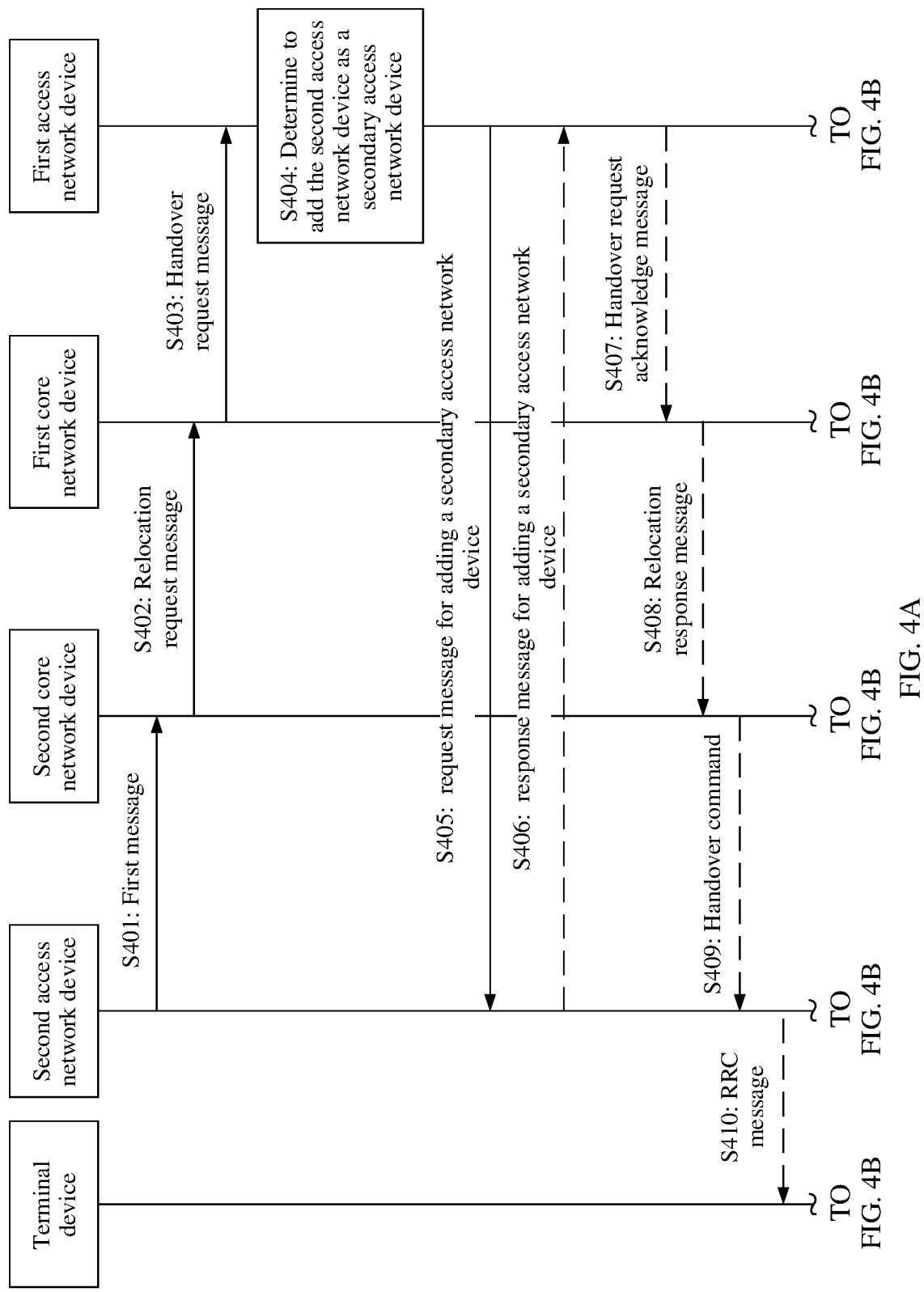
FIG. 4A and FIG. 4B are an example flowchart of an inter-system handover method according to this application.
Figure 4B:
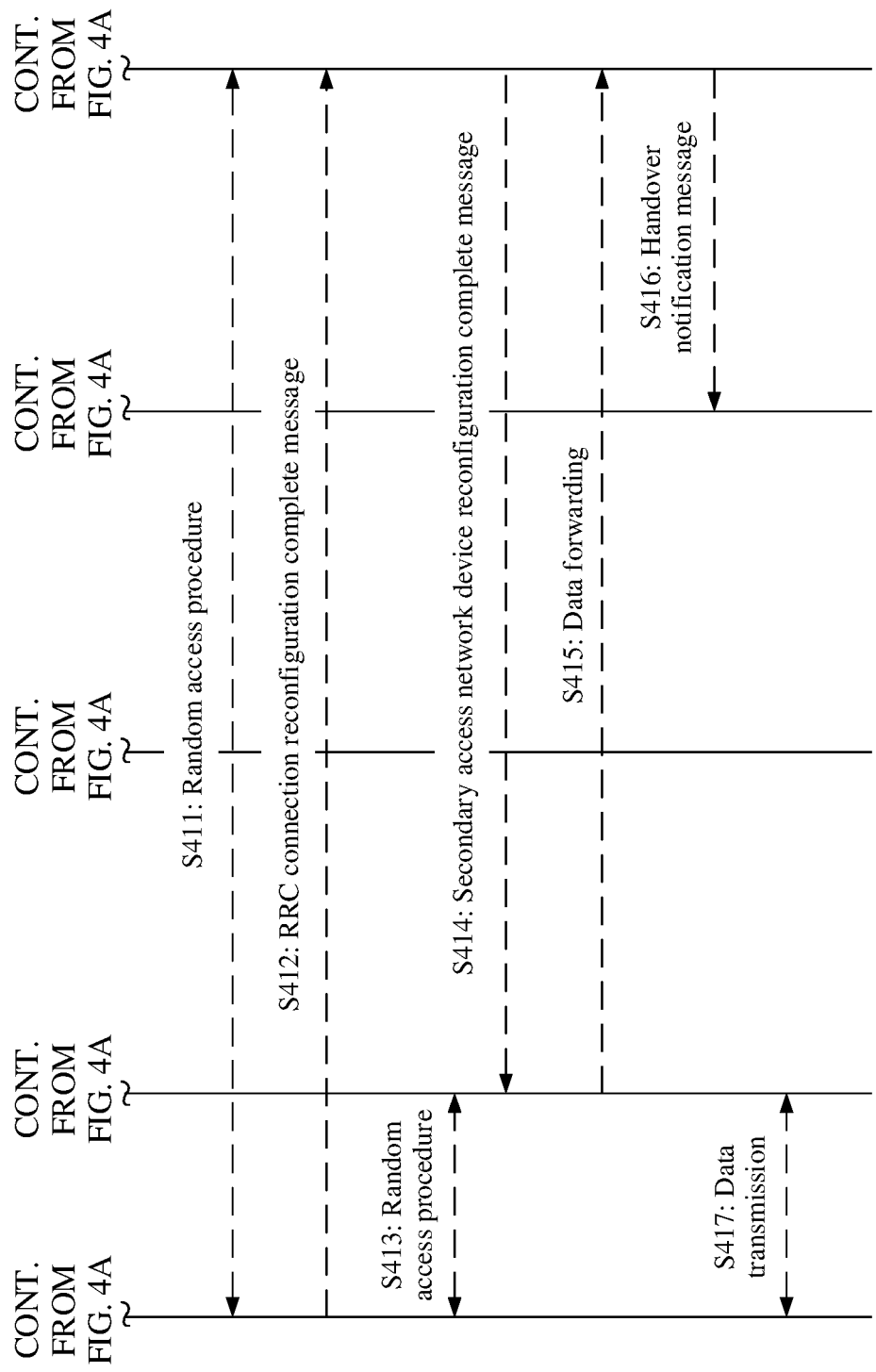

FIG. 4A and FIG. 4B are a schematic flowchart of an inter-system handover method according to this application. The following describes steps of the method 400.

S401: A second access network device sends a first message to a second core network device. Accordingly, the second core network device receives the first message.

The first message is used to request a first access network device to allocate a resource to a terminal device. The terminal device is a terminal device on which a handover procedure is to be performed. After the first access network device allocates the resource to the terminal device, the terminal device may be handed over to the first access network device.

The first message may include an identity of the terminal device. The identity of the terminal device is an identity of the terminal device on the second access network device side.

For example, the identity of the terminal device may include one or more of the following: a frequency channel number of a serving cell that is of the second access network device and in which the terminal device is located, a PCI of the serving cell that is of the second access network device and in which the terminal device is located, a C-RNTI allocated to the terminal device by the serving cell that is of the second access network device and in which the terminal device is located, an identity of the terminal device on an interface between the second access network device and the second core network device, and transport layer information (for example, an IP address of a tunnel port and/or an identifier of the tunnel port) that corresponds, on a user plane transport tunnel between the second access network device and the second core network device, to a protocol data unit (protocol data unit, PDU) session corresponding to a data service of the terminal device.

For example, the identity of the terminal device may be the C-RNTI. For another example, the identity of the terminal device may be jointly represented by the frequency channel number, the PCI, and the C-RNTI.

For example, the identity of the terminal device on the interface between the second access network device and the second core network device may be allocated by the second access network device, or may be allocated by the second core network device.

It should be understood that the serving cell that is of the second access network device and in which the terminal device is located is a serving cell provided by the second access network device for the terminal device.

For example, the second core network device is a control plane device in a 5GC. The interface between the second access network device and the second core network device is an NG interface. The identity of the terminal device on the interface between the second access network device and the second core network device may be a RAN UE NGAP ID, and the second access network device uniquely associates the identity with the terminal device on the NG interface. Alternatively, the identity of the terminal device on the interface between the second access network device and the second core network device may be an AMF UE NGAP ID, and the second core network device uniquely associates the identity with the terminal device on the NG interface. The transport layer information that corresponds, on the user plane transport tunnel between the second access network device and the second core network device, to the PDU session corresponding to the data service of the terminal device may be NG user plane transport layer information, for example, an IP address of a GPRS tunneling protocol (GTP) tunnel port and an identifier of the GTP tunnel port, of a PDU session tunnel on the second access network device side.

Optionally, the first message may further include an identity of the second access network device.

The following describes a first identity with reference to two scenarios.

Scenario 1:

An identity used when the second access network device provides the terminal device with a service for connecting to a second core network is the same as an identity used when the second access network device provides the terminal device with a service for connecting to a first core network.

In this specification, for ease of understanding, the identity of the second access network device in Scenario 1 is denoted as an identity #1.

For example, the identity #1 may include one or more of the following: a global base station identifier (global RAN identifier) of the second access network device, a frequency channel number of a cell managed by the second access network device, a PCI of the cell managed by the second access network device, the PCI of the serving cell that is of the second access network device and in which the terminal device is located, the frequency channel number of the serving cell that is of the second access network device and in which the terminal device is located, and a cell global identifier (CGI) of the serving cell that is of the second access network device and in which the terminal device is located.

For example, the global base station identifier may include a public land mobile network (PLMN) identifier and a base station identifier. For example, the global base station identifier may be jointly represented by the PLMN identifier and the base station identifier. For example, the second access network device is a control plane device in the 5GC. The global base station identifier of the second access network device is a global NodeB ID of the second access network device.

For example, the identity #1 may be jointly represented by the frequency channel number of the cell managed by the second access network device and the PCI of the cell managed by the second access network device. Alternatively, the identity #1 may be jointly represented by the frequency channel number of the serving cell that is of the second access network device and in which the terminal device is located and the CGI of the serving cell that is of the second access network device and in which the terminal device is located.

Scenario 2:

An identity used when the second access network device provides the terminal device with a service for connecting to a second core network is different from an identity used when the second access network device provides the terminal device with a service for connecting to a first core network.

In this scenario, there are two implementations:

Manner 1: The identity of the second access network device may be the identity used when the second access network device provides the terminal device with the service for connecting to the first core network.

Manner 2: The identity of the second access network device may be the identity used when the second access network device provides the terminal device with the service for connecting to the second core network.

Different implementations correspond to different method procedures. Details are described in subsequent steps.

In this specification, for ease of understanding, the identity of the second access network device in Manner 1 in Scenario 2 is denoted as an identity #2, and the identity of the second access network device in Manner 2 in Scenario 2 is denoted as an identity #3.

For example, the identity #2 may include one or more of the following: a global base station identifier that is used when the second access network device provides the terminal device with the service for connecting to the first core network and that is of the second access network device, a frequency channel number that is used when the second access network device provides the terminal device with the service for connecting to the first core network and that is of a cell managed by the second access network device, a PCI that is used when the second access network device provides the terminal device with the service for connecting to the first core network and that is of the cell managed by the second access network device, a PCI that is used when the second access network device provides the terminal device with the service for connecting to the first core network and that is of the serving cell that is of the second access network device and in which the terminal device is located, a frequency channel number that is used when the second access network device provides the terminal device with the service for connecting to the first core network and that is of the serving cell that is of the second access network device and in which the terminal device is located, and a CGI that is used when the second access network device provides the terminal device with the service for connecting to the first core network and that is of the serving cell that is of the second access network device and in which the terminal device is located.

For example, the global base station identifier may include a PLMN identifier and a base station identifier. For example, a first network system is a system connected to a 4G core network. The base station identifier of the second access network device is an en-gNB ID.

For example, the identity #2 may be jointly represented by frequency channel numbers that are used when the second access network device provides the terminal device with the service for connecting to the first core network and that are of all cells managed by the second access network device and PCIs that are used when the second access network device provides the terminal device with the service for connecting to the first core network and that are of all the cells managed by the second access network device.

For example, a first core network device is a control plane device in an EPC, and the second core network device is the control plane device in the 5GC. The global base station identifier that is used when the second access network device provides the terminal device with the service for connecting to the first core network and that is of the second access network device is a global en-gNodeB identifier global en-gNB ID of the second access network device serving as an access network device in an NSA. The frequency channel number that is used when the second access network device provides the terminal device with the service for connecting to the first core network and that is of the cell managed by the second access network device is a frequency channel number of a cell managed by the second access network device serving as the access network device in the NSA. Other cases are similar to the foregoing descriptions, and are not described one by one herein again.

For example, the identity #3 may include one or more of the following: a global base station identifier that is used when the second access network device provides the terminal device with the service for connecting to the second core network and that is of the second access network device, a frequency channel number that is used when the second access network device provides the terminal device with the service for connecting to the second core network and that is of a cell managed by the second access network device, a PCI that is used when the second access network device provides the terminal device with the service for connecting to the second core network and that is of the cell managed by the second access network device, a PCI that is used when the second access network device provides the terminal device with the service for connecting to the second core network and that is of the serving cell that is of the second access network device and in which the terminal device is located, a frequency channel number that is used when the second access network device provides the terminal device with the service for connecting to the second core network and that is of the serving cell that is of the second access network device and in which the terminal device is located, and a CGI that is used when the second access network device provides the terminal device with the service for connecting to the second core network and that is of the serving cell that is of the second access network device and in which the terminal device is located.

For example, the global base station identifier may include a PLMN identifier and a base station identifier.

For example, a first core network device is still a control plane device in an EPC, and the second core network device is still the control plane device in the 5GC. The global base station identifier that is used when the second access network device provides the terminal device with the service for connecting to the second core network and that is of the second access network device is a global gNodeB identifier global gNB ID of the second access network device serving as an access network device in an SA. The frequency channel number that is used when the second access network device provides the terminal device with the service for connecting to the second core network and that is of the cell managed by the second access network device is a frequency channel number of a cell managed by the second access network device serving as the access network device in the SA. Other cases are similar to the foregoing descriptions. Details are not described herein again.

Optionally, the first message may be a handover required (handover required) message. However, this is not limited in this application.

Optionally, the identity of the second access network device and/or the identity of the terminal device may be carried in a source to target transparent container (source to Target Transparent container) in the handover required message.

S402: The second core network device sends a relocation request (relocation request) message to the first core network device. Accordingly, the first core network device receives the relocation request message.

The relocation request message is used to request the first access network device to allocate the resource to the terminal device. The relocation request message may include the identity of the terminal device.

Optionally, the relocation request message may further include the identity of the second access network device.

It should be understood that the relocation request message is merely an example name, and the relocation request message may alternatively have another name.

Optionally, the identity of the second access network device and/or the identity of the terminal device may be carried in a source to target transparent container in the relocation request message.

S403: The first core network device sends a handover request (handover request) message to the first access network device. Accordingly, the first access network device receives the handover request message.

The handover request message is used to request to hand over the terminal device to the first access network device, and request the first access network device to allocate the resource to the terminal device. The handover request message may include the identity of the terminal device.

Optionally, the handover request message may further include the identity of the second access network device.

It should be understood that the handover request message is merely an example name, and the handover request message may alternatively have another name.

Optionally, the identity of the second access network device and/or the identity of the terminal device may be carried in a source to target transparent container in the handover request message.

S404: The first access network device determines that a secondary access network device to be added for the terminal device is the second access network device.

For example, the first access network device may determine, based on the identity of the second access network device, that the secondary access network device to be added for the terminal device is the second access network device. Alternatively, the first access network device may learn, based on an identifier that is carried in the handover request message and that is of a serving cell that is before the handover (where for example, the handover request message carries movement history information of the terminal device, and the serving cell that is before the handover of the terminal device may be learned of from the movement history information of the terminal device; or the handover request message directly carries the identifier of the serving cell that is before the handover), of the second access network device that is before the handover, to determine that the secondary access network device to be added for the terminal device is the second access network device.

S405: The first access network device sends a request message for adding a secondary access network device to the second access network device. Accordingly, the second access network device receives the request message for adding a secondary access network device.

The request message for adding a secondary access network device includes the identity of the terminal device. The request message for adding a secondary access network device is used to request to add the second access network device as the secondary access network device of the terminal device.

For example, in S404, after receiving the handover request message, the first access network device may determine to add the second access network device corresponding to the identity of the second access network device as the secondary access network device of the terminal device. Then, S405 is performed.

For another example, in S404, the first access network device may first determine a secondary access network device, and then determine, based on the identity of the second access network device, whether the determined secondary access network device is the second access network device. If the secondary access network device determined by the first access network device is the second access network device, S405 is performed.

The following describes S404 by using examples with reference to the two scenarios described in S401.

For Scenario 1, because the identity used when the second access network device provides the terminal device with the service for connecting to the second core network is the same as the identity used when the second access network device provides the terminal device with the service for connecting to the first core network, the first access network device may determine that an access network device corresponding to the identity of the second access network device is the second access network device, to determine that the secondary access network device to be added for the terminal device is the second access network device.

For Manner 1 in Scenario 2, after receiving the handover request message, the first access network device may determine to add the second access network device corresponding to the identity of the second access network device as the secondary access network device of the terminal device. Alternatively, the first access network device may first determine a secondary access network device, and then compare whether an identity of the determined secondary access network device is the identity of the second access network device. If the identity of the determined secondary access network device is the identity of the second access network device, the first access network device may determine that the secondary access network device is the second access network device.

For Manner 2 in Scenario 2, the first access network device may determine, based on the identity of the second access network device and a first mapping relationship, that the secondary access network device to be added for the terminal device is the second access network device. The first mapping relationship is a mapping relationship between the identity used when the second access network device provides the terminal device with the service for connecting to the second core network and the identity used when the second access network device provides the terminal device with the service for connecting to the first core network. That is, the first mapping relationship is a mapping relationship between the identity #2 and the identity #3.

Specifically, after receiving the identity of the second access network device actually identified by using the identity #3, the first access network device may determine, based on the mapping relationship between the identity #2 and the identity #3, that the identity #3 corresponds to the identity #2. In this way, the first access network device may add the access network device (namely, the second access network device) identified by using (or corresponding to) the identity #2 to be the secondary access network device. Alternatively, the first access network device may first determine a secondary access network device, and then compare whether an identity of the determined secondary access network device is the identity #2. If the identity of the determined secondary access network device is the identity #2, the first access network device determines that the secondary access network device to be added for the terminal device is the second access network device.

Optionally, the first mapping relationship may be sent by the second access network device to the first access network device.

It should be understood that the second access network device may send the first mapping relationship before step S404. For example, when an Xn/X2 interface connection is set up between the second access network device and the first access network device, the second access network device may send the first mapping relationship to the first access network device.

For example, for EN-DC, the first mapping relationship may be carried in an EN-DC X2 setup request message or an EN-DC X2 setup response message between the first access network device and the second access network device. If the second access network device initiates the EN-DC X2 setup request message, the second access network device includes the first mapping relationship in the message. If the first access network device initiates the EN-DC X2 setup request message, the second access network device includes the first mapping relationship in the EN-DC X2 setup response message.

Optionally, a mapping relationship between the identity of the second access network device and a second identity may include one or more of the following: a mapping relationship between the global base station identifier used when the second access network device provides the terminal device with the service for connecting to the first core network and the global base station identifier used when the second access network device provides the terminal device with the service for connecting to the second core network; a mapping relationship between the frequency channel number that is used when the second access network device provides the terminal device with the service for connecting to the first core network and that is of the cell managed by the second access network device and the frequency channel number that is used when the second access network device provides the terminal device with the service for connecting to the second core network and that is of the cell managed by the second access network device; a mapping relationship between the PCI that is used when the second access network device provides the terminal device with the service for connecting to the first core network and that is of the cell managed by the second access network device and the PCI that is used when the second access network device provides the terminal device with the service for connecting to the second core network and that is of the cell managed by the second access network device; a mapping relationship between the PCI that is used when the second access network device provides the terminal device with the service for connecting to the first core network and that is of the serving cell that is of the second access network device and in which the terminal device is located and the PCI that is used when the second access network device provides the terminal device with the service for connecting to the second core network and that is of the serving cell that is of the second access network device and in which the terminal device is located; a mapping relationship between the frequency channel number that is used when the second access network device provides the terminal device with the service for connecting to the first core network and that is of the serving cell that is of the second access network device and in which the terminal device is located and the frequency channel number that is used when the second access network device provides the terminal device with the service for connecting to the second core network and that is of the serving cell that is of the second access network device and in which the terminal device is located; and a mapping relationship between the CGI that is used when the second access network device provides the terminal device with the service for connecting to the first core network and that is of the serving cell that is of the second access network device and in which the terminal device is located and the CGI that is used when the second access network device provides the terminal device with the service for connecting to the second core network and that is of the serving cell that is of the second access network device and in which the terminal device is located.

It should be noted that, in practice, the first access network device may alternatively select, as the secondary access network device, another access network device different from the second access network device.

After the second access network device receives the request message for adding a secondary access network device, if the second access network device determines, based on the identity of the terminal device, that the terminal device is a terminal device that the secondary access network device is serving (in other words, before the handover), the second access network device may skip forwarding of data corresponding to a bearer terminated at the second access network device. In other words, it is not required that the data corresponding to the bearer terminated at the second access network device be first sent by the second access network to the second core network, then forwarded by the second core network to the first core network, and sent by the first core network to the second access network, and it is not required that the data corresponding to the bearer terminated at the second access network device be first sent to the first access network device, and then forwarded by the first access network device to the second access network device.

It should be understood that bearers terminated at the second access network device may include an SCG bearer terminated at the second access network device, a split bearer terminated at the second access network device, and an MCG bearer terminated at the second access network device.

In conclusion, according to the method provided in this application, the second access network device may provide, in a handover process, the first access network device with the identity of the terminal device on which the handover procedure is to be performed. When determining that a target secondary access network device (namely, the foregoing secondary access network device) and a source access network device (namely, the second access network device) are a same access network device, the first access network device provides the source access network device with the identity of the terminal device, so that the source access network device does not forward data corresponding to a bearer terminated at the source access network device, and then a data transmission delay can be reduced.

Optionally, the method may further include some or all of steps S406 to S413.

S406: The second access network device sends a response message for adding a secondary access network device to the first access network device.

Accordingly, the first access network device receives the response message for adding a secondary access network device.

After the second access network device receives the request message for adding a secondary access network device, if the second access network device agrees to serve as the secondary access network device of the terminal device, the second access network device sends the response message for adding a secondary access network device to the first access network device.

It should be understood that the first access network device is to serve as a master access network device of the terminal device.

S407: The first access network device sends a handover request acknowledge message to the first core network device.

Optionally, the handover request acknowledge message may include indication information for keeping context of the terminal device.

Optionally, the indication information for keeping context of the terminal device may be carried in a target to source transparent container in the handover request acknowledge message.

S408: The first core network device sends a relocation response message to the second core network device.

It should be understood that the relocation response message is used to respond to the foregoing relocation request message.

Optionally, the relocation response message may include indication information for keeping context of the terminal device.

Optionally, the indication information for keeping context of the terminal device may be carried in a target to source transparent container in the relocation response message.

S409: The second core network device sends a handover command to the second access network device.

It should be understood that the handover command is used to respond to the foregoing first message.

Optionally, the handover command may include indication information for keeping context of the terminal device.

Optionally, the indication information for keeping context of the terminal device may be carried in a target to source transparent container in the handover command.

S410: The second access network device sends an RRC message to the terminal device.

The RRC message is used to notify the terminal device to be handed over to the first access network device.

For example, in a scenario of handover from NR to the EN-DC, the RRC message may be a mobility from NR command (mobilityfromNRCommand).

S411: The terminal device and the first access network device perform a random access procedure.

S412: The terminal device sends an RRC connection reconfiguration complete (RRC connection reconfiguration complete) message to the first access network device.

Through steps S410 to S412, the terminal device may access the first access network device, and the second access network device may provide the terminal device with the service for connecting to the first core network.

For specific content of steps S410 to S412, refer to a current technology.

S413: The terminal device and the second access network device perform a random access procedure.

The step may be performed, or may not be performed. A main function of the step is that the terminal device accesses the second access network device, and the second access network device adjusts uplink timing for the terminal device, to avoid interference between terminal devices served by the second access network device.

S414: The first access network device sends a secondary access network device reconfiguration complete message to the second access network device.

S415: The second access network device initiates data forwarding (data forwarding).

That is, the second access network device sends, to the first access network device, data corresponding to a bearer terminated at the first access network device (where the bearer terminated at the first access network device is used after the handover). The data includes data that the second access network device has received and/or is to subsequently receive from the second core network. The second access network device may directly send the data to the first access network device. Alternatively, the second access network device may first send the data to the second core network, then the second core network forwards the data to the first core network, and the first core network sends the data to the first access network device.

It should be understood that bearers terminated at the first access network device may include an SCG bearer terminated at the first access network device, a split bearer terminated at the first access network device, and an MCG bearer terminated at the first access network device.

It should be further understood that S415 may alternatively be performed after S409.

S416: The first access network device sends a handover notification message to the first core network device.

The handover notification message is used to notify the first core network device that the handover of the terminal device to the first access network device has been completed.

Then, the first core network device may send a bearer modification message to a user plane device in the first core network.

For example, when the first core network device is the control plane device in the EPC, the user plane device in the first core network is an S-GW.

The bearer modification message is used to notify that the terminal device has accessed a target side device, and the user plane device in the first core network may notify a user plane device in the second core network that the user plane device in the second core network may stop sending data to the second access network device.

S417: The second access network device performs data transmission with the terminal device.

For example, if the second core network device is the control plane device in the 5GC, and the first core network device is the control plane device in the EPC, the second access network device may map, based on a mapping relationship between a QoS flow and an E-RAB, a data packet that is of a QoS flow and that is received from the second core network device to a DRB corresponding to an E-RAB applicable after handover, and send the data packet to the terminal device.

For another example, if the first core network device is a control plane device in the 5GC, and the second core network device is a control plane device in the EPC, the second access network device may map, based on a mapping relationship between a QoS flow and an E-RAB, a data packet that is of an E-RAB and that is received from the second core network device to a DRB corresponding to a handed over QoS flow, and send the data packet to the terminal device.

Optionally, when the second access network device performs data transmission with the terminal device, to enable data transmission between the second access network device and the terminal device to be uninterrupted, the second access network device may continue to communicate with the terminal device in the handover process. The second access network device continues to perform data communication with the terminal device by using a key applicable before the handover, and the second access network device performs data communication with the terminal device by using a key applicable after the handover (that is, serving as a key of the secondary access network device).

For example, in Solution 1, the second access network device transmits, on a first DRB by using the key applicable before the handover, a data packet received from the second core network, and the second access network device transmits, on a second DRB by using the key applicable after the handover, a data packet (a data packet received from the first core network) corresponding to the bearer terminated at the second access network device. The first DRB may be one or more DRBs, the second DRB may be one or more DRBs, and there is no intersection between the first DRB and the second DRB.

Solution 2: The second access network device first transmits, on one or more DRBs by using the key applicable before the handover, a data packet received from the second core network. After sending data to the terminal device, the second access network device transmits, on the one or more DRBs by using the key applicable after the handover, a data packet (a data packet received from the first core network) corresponding to the bearer terminated at the second access network device.

Solution 3: The second access network device sets up two logical channels on one DRB. In addition, the second access network device transmits, on one of the logical channels by using the key applicable before the handover, a data packet received from the second core network, and transmits, on the other logical channel by using the key applicable after the handover, a data packet (a data packet received from the first core network) corresponding to the bearer terminated at the second access network device.

It should be understood that a sequence of the foregoing steps is not limited in this application. Values of step numbers in the method 400 do not represent an actual execution sequence of the method. In practice, not all steps in the method 400 need to be performed, and a sequence of the steps may alternatively be different from the sequence shown in FIG. 4A and FIG. 4B.

The method provided in embodiments of this application is described above in detail with reference to FIG. 4A and FIG. 4B. Apparatuses provided in embodiments of this application are described below in detail with reference to FIG. 5 to FIG. 7.

Figure 5:
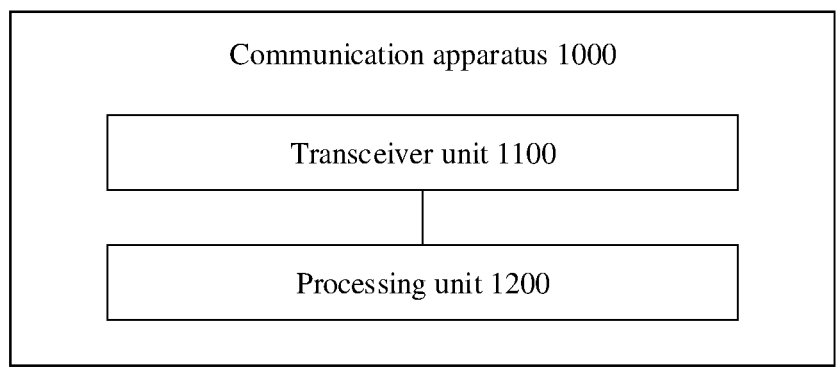
FIG. 5 is a schematic block diagram of a communication apparatus according to this application.

FIG. 5 is a schematic block diagram of a communication apparatus according to an embodiment of this application. As shown in FIG. 5, the communication apparatus 1000 may include a transceiver unit 1100 and a processing unit 1200.

The transceiver unit 1100 may be configured to send information to another apparatus or receive information from the another apparatus, for example, send or receive a request message for adding a secondary access network device. The processing unit 1200 may be configured to perform internal processing of the apparatus, for example, determine that a secondary access network device to be added for a terminal device is a second access network device.

In an implementation, the communication apparatus 1000 may correspond to a first access network device. The communication apparatus 1000 may be the first access network device or a chip disposed in the first access network device, and may include units configured to perform operations performed by the first access network device. In addition, the units in the communication apparatus 1000 are separately configured to implement the operations performed by the first access network device in the foregoing method.

Specifically, the transceiver unit 1100 is configured to receive a handover request message from a first core network device, where the handover request message includes an identity of a terminal device, the apparatus provides the terminal device with a service for connecting to a first core network, and the first core network device belongs to the first core network. The processing unit 1200 is configured to determine that a secondary access network device to be added for the terminal device is a second access network device, where the second access network device provides the terminal device with a service for connecting to a second core network. The transceiver unit 1100 is further configured to send a request message for adding a secondary access network device to the second access network device, where the request message for adding a secondary access network device includes the identity of the terminal device.

Optionally, the identity of the terminal device is a cell radio network temporary identifier C-RNTI allocated to the terminal device in a serving cell that is of the second access network device and in which the terminal device is located; or the identity of the terminal device is an identity of the terminal device on an interface between the second access network device and a second core network device, where the second core network device belongs to the second core network.

Optionally, the handover request message further includes an identity of the second access network device.

Optionally, the identity of the second access network device is an identity used when the second access network device provides the terminal device with the service for connecting to the first core network.

Optionally, the identity of the second access network device is an identity used when the second access network device provides the terminal device with the service for connecting to the second core network.

Optionally, the transceiver unit 1100 is further configured to receive a first mapping relationship from the second access network device, where the first mapping relationship is a mapping relationship between an identity used when the second access network device provides the terminal device with the service for connecting to the first core network and the identity used when the second access network device provides the terminal device with the service for connecting to the second core network. The processing unit 1200 is specifically configured to determine, based on the identity of the second access network device and the first mapping relationship, that the secondary access network device to be added for the terminal device is the second access network device.

In another implementation, the communication apparatus 1000 may correspond to the second access network device. The communication apparatus 1000 may be the second access network device or a chip disposed in the second access network device, and may include units configured to perform operations performed by the second access network device. In addition, the units in the communication apparatus 1000 are separately configured to implement the operations performed by the second access network device in the foregoing method.

Specifically, the transceiver unit 1100 is configured to send a first message to a second core network device, where the first message includes an identity of the terminal device, the apparatus provides the terminal device with a service for connecting to a second core network, the second core network device belongs to the second core network, the first message is used to request a first access network device to allocate a resource to the terminal device, and the first access network device provides the terminal device with a service for connecting to a first core network. The transceiver unit 1100 is further configured to receive the request message for adding a secondary access network device from the first access network device, where the first access network device is a master access network device of the terminal device, the request message for adding a secondary access network device includes the identity of the terminal device, and the request message for adding a secondary access network device is used to request to add the apparatus as the secondary access network device of the terminal device.

Optionally, the identity of the terminal device is a cell radio network temporary identifier C-RNTI allocated to the terminal device in a serving cell that is of the apparatus and in which the terminal device is located; or the identity of the terminal device is an identity of the terminal device on an interface between the apparatus and the second core network device.

Optionally, the first message further includes an identity of the apparatus.

Optionally, the identity of the second access network device is an identity used when the apparatus provides the terminal device with the service for connecting to the first core network.

Optionally, the identity of the second access network device is an identity used when the apparatus provides the terminal device with the service for connecting to the second core network.

Optionally, the transceiver unit 1100 is further configured to send a first mapping relationship to the first access network device, where the first mapping relationship is a mapping relationship between an identity used when the apparatus provides the terminal device with the service for connecting to the first core network and the identity used when the apparatus provides the terminal device with the service for connecting to the second core network.

Optionally, the transceiver unit 1100 is further configured to send, to the first access network device, data corresponding to a bearer terminated at the first access network device.

Optionally, the processing unit 1200 is configured to skip forwarding of data corresponding to a bearer terminated at the apparatus.

Optionally, the processing unit 1200 is further configured to map, based on a mapping relationship between a quality of service QoS flow and an evolved universal terrestrial radio access network radio access bearer E-RAB, a data packet that is of a QoS flow and that is received from the second core network device to a data radio bearer DRB corresponding to an E-RAB applicable after handover. The sending unit 1100 is further configured to send, to the terminal device, the data packet mapped to the data radio bearer DRB corresponding to the handed over E-RAB.

In still another implementation, the communication apparatus 1000 may correspond to a first core network device. The communication apparatus 1000 may be the first core network device or a chip disposed in the first core network device, and may include units configured to perform operations performed by the first core network device. In addition, the units in the communication apparatus 1000 are separately configured to implement the operations performed by the first core network device in the foregoing method.

Specifically, the transceiver unit 1100 is configured to receive a first message from the second access network device. The transceiver unit 1100 is further configured to send a relocation request message to a first core network device based on the first message. The first message includes an identity of the terminal device, and the first message is used to request a first access network device to allocate a resource to the terminal device. The relocation request message includes the identity of the terminal device. The second access network device provides the terminal device with a service for connecting to a second core network, and the first access network device provides the terminal device with a service for connecting to a first core network. The apparatus 1000 belongs to the second core network, and the first core network device belongs to the first core network.

In still another implementation, the communication apparatus 1000 may correspond to a second core network device. The communication apparatus 1000 may be the second core network device or a chip disposed in the second core network device, and may include units configured to perform operations performed by the second core network device. In addition, the units in the communication apparatus 1000 are separately configured to implement the operations performed by the second core network device in the foregoing method.

Specifically, the transceiver unit 1100 is configured to receive a relocation request message from a second core network device, where the relocation request message includes an identity of the terminal device, the second access network device provides the terminal device with a service for connecting to a second core network, and a first access network device provides the terminal device with a service for connecting to a first core network. The transceiver unit is further configured to send a handover request message to the first access network device, where the handover request message includes the identity of the terminal device. The second core network device belongs to the second core network, and the apparatus 1000 belongs to the first core network.

It should be understood that a specific process in which the units perform the foregoing corresponding steps performed by the corresponding network elements has been described in detail in the foregoing method embodiment. For brevity, details are not described herein again.

Figure 6:
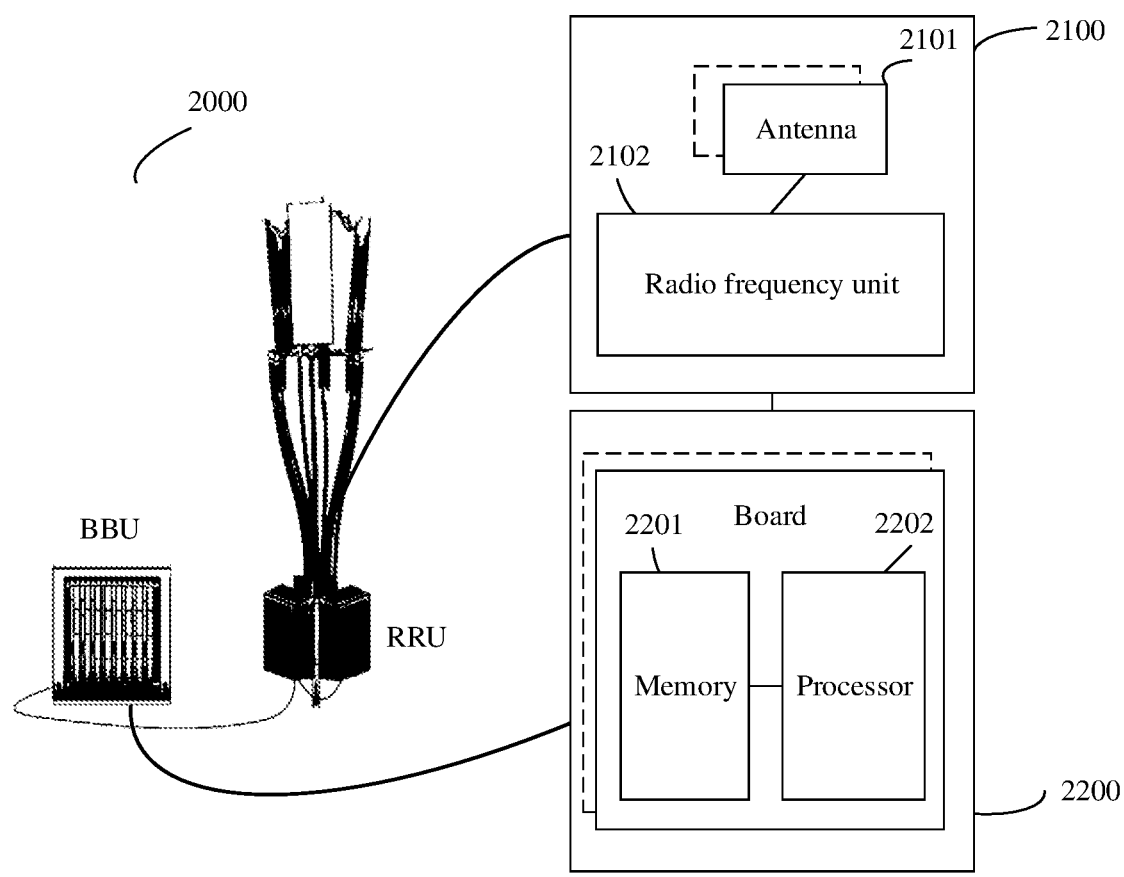
FIG. 6 is a schematic diagram of a structure of an access network device according to this application.

It should be further understood that when the communication apparatus 1000 is the first access network device or the second access network device, the transceiver unit 1100 in the communication apparatus 1000 may correspond to an RRU 2100 in an access network device 2000 shown in FIG. 6, and the processing unit 1200 in the communication apparatus 1000 may correspond to a BBU 2200 in the access network device 2000 shown in FIG. 6. When the communication apparatus 1000 is the chip configured in the first access network device or the second access network device, the transceiver unit 1100 in the communication apparatus 1000 may be an input/output interface.

Figure 7:
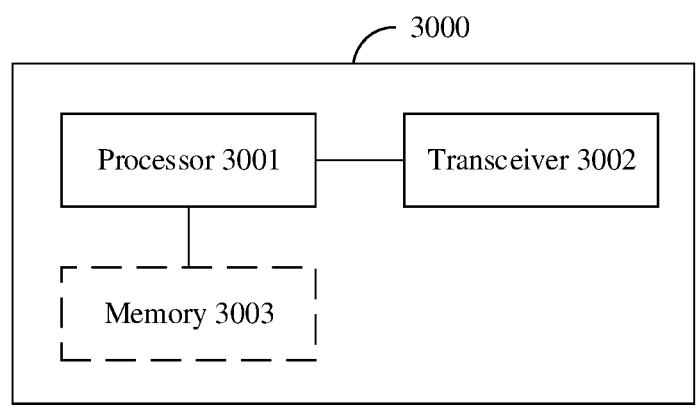
FIG. 7 is a schematic diagram of a structure of another communication apparatus according to this application.

It should be further understood that when the communication apparatus 1000 is the first core network device or the second core network device, the transceiver unit 1100 in the communication apparatus 1000 may correspond to a transceiver 3002 in a communication apparatus 3000 shown in FIG. 7, and the processing unit 1200 in the communication apparatus 1000 may correspond to a processor 3001 in the communication apparatus 3000 shown in FIG. 7.

FIG. 6 is a schematic diagram of a structure of an access network device according to an embodiment of this application, for example, may be a schematic diagram of a structure of a base station. The base station 2000 may be used in the system shown in FIG. 3, and performs functions of the first access network device or the second access network device in the foregoing method embodiments. As shown in the figure, the base station 2000 may include one or more radio frequency units such as remote radio units (RRU) 2100 and one or more baseband units (BBU) (which may also be referred to as distributed units (DU)) 2200. The RRU 2100 may be referred to as a transceiver unit or a communication unit, and corresponds to the transceiver unit 1100 in FIG. 5. Optionally, the transceiver unit 2100 may also be referred to as a transceiver, a transceiver circuit, or the like, and may include at least one antenna 2101 and a radio frequency unit 2102. Optionally, the transceiver unit 2100 may include a receiving unit and a sending unit. The receiving unit may correspond to a receiver (or referred to a receiver circuit), and the sending unit may correspond to a transmitter (or referred to as a transmitter circuit). The RRU 2100 is mainly configured to send and receive radio frequency signals and perform conversion between a radio frequency signal and a baseband signal. The BBU 2200 is mainly configured to perform baseband processing, control the base station, and so on. The RRU 2100 and the BBU 2200 may be physically disposed together, or may be physically separated, that is, the base station is a distributed base station.

The BBU 2200 is a control center of the base station, and may also be referred to as a processing unit. The BBU 2200 may correspond to the processing unit 1200 in FIG. 5, and is mainly configured to implement a baseband processing function, for example, channel coding, multiplexing, modulation, or spreading. For example, the BBU (the processing unit) may be configured to control the base station to perform operation procedures related to the access network device in the foregoing method embodiment.

In an example, the BBU 2200 may include one or more boards, and a plurality of boards may jointly support a radio access network (for example, an LTE network) having a single access standard, or may separately support radio access networks (for example, the LTE network, a 5G network, or another network) having different access standards. The BBU 2200 further includes a memory 2201 and a processor 2202. The memory 2201 is configured to store necessary instructions and data. The processor 2202 is configured to control the base station to perform a necessary action, for example, is configured to control the base station to perform the operation procedures related to the access network device in the foregoing method embodiment. The memory 2201 and the processor 2202 may serve one or more boards. In other words, the memory and the processor may be separately disposed on each board. Alternatively, the plurality of boards may share a same memory and processor. In addition, a necessary circuit may be further disposed on each board.

It should be understood that the base station 2000 shown in FIG. 6 can implement processes related to the first access network device or the second access network device in the foregoing method embodiment. The operations or the functions of the modules in the base station 2000 are separately used to implement corresponding procedures in the foregoing method embodiment. For details, refer to the descriptions in the foregoing method embodiment. To avoid repetition, detailed descriptions are appropriately omitted herein.

The BBU 2200 may be configured to perform actions implemented inside the first access network device or the second access network device in the foregoing method embodiment, and the RRU 2100 may be configured to perform sending or receiving actions performed by the first access network device or the second access network device in the foregoing method embodiment. For details, refer to the descriptions in the foregoing method embodiment. Details are not described herein again.

FIG. 7 is a schematic diagram of a structure of a communication apparatus 3000 according to an embodiment of this application. As shown in FIG. 7, the communication apparatus 3000 includes a processor 3001 and a transceiver 3002. Optionally, the communication apparatus 3000 may further include a memory 3003. The processor 3001, the transceiver 3002, and the memory 3003 may communicate with each other through an internal connection path, to transfer a control signal and/or a data signal. The memory 3003 is configured to store a computer program, and the processor 3001 is configured to invoke the computer program from the memory 3003 and run the computer program, to implement the foregoing method embodiment.

The processor 3001 and the memory 3003 may be integrated into a processing apparatus. It should be understood that the memory 3003 may alternatively be integrated into the processor 3001, or may be independent of the processor 3001. This is not limited in this application.

In an implementation, the communication apparatus 3000 is configured to perform the action performed by the first core network device in the foregoing method embodiment. In this case, execution of the program stored in the memory 3003 enables the processor 3001 to be configured to perform the internal processing operation (for example, a determining step) on the first core network device side in the foregoing method embodiment, and execution of the program stored in the memory 3003 enables the processor 3001 to control the transceiver 3002 to perform the receiving and sending steps on the first core network device side in the foregoing method embodiment.

In an implementation, the communication apparatus 3000 is configured to perform the action performed by the second core network device in the foregoing method embodiment. In this case, execution of the program stored in the memory 3003 enables the processor 3001 to be configured to perform the internal processing operation (for example, a determining step) on the second core network device side in the foregoing method embodiment, and execution of the program stored in the memory 3003 enables the processor 3001 to control the transceiver 3002 to perform the receiving and sending steps on the second core network device side in the foregoing method embodiment.

It should be understood that the processing apparatus or the processor may be a chip. For example, the processing apparatus or the processor may be a field programmable gate array (FPGA), may be a general-purpose processor, a digital signal processor (DSP), an application specific integrated circuit (ASIC), the field programmable gate array (FPGA), another programmable logic device, a discrete gate, a transistor logic device, or a discrete hardware component, may be a system on chip (SoC), may be a central processing unit (CPU), may be a network processor (NP), may be a digital signal processing circuit (DSP), may be a micro controller unit (MCU), or may be a programmable controller (PLD) or another integrated chip. The general-purpose processor may be a microprocessor, or the processor may be any conventional processor or the like. Steps of the method disclosed with reference to embodiments of this application may be directly performed and completed by using a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing method in combination with hardware of the processor.

The memory 3003 may be a volatile memory or a nonvolatile memory, or may include the volatile memory and the nonvolatile memory. The nonvolatile memory may be a read-only memory (ROM), a programmable read-only memory (PROM), an erasable programmable read-only memory (EPROM), an electrically erasable programmable read-only memory (electrically EPROM, EEPROM), or a flash memory. The volatile memory may be a random access memory (RAM) that is used as an external cache. By way of example but not limitative description, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that the memory in the system and method described in this specification aims to include, but not limited to, these memories and any memory of another appropriate type.

This application further provides a computer program product. The computer program product includes computer program code. When the computer program code is run on a computer, the computer is enabled to perform the method performed by the first access network device, the second access network device, the first core network device, or the second core network device in the foregoing method embodiment.

This application further provides a computer-readable medium. The computer-readable medium stores program code. When the program code is run on a computer, the computer is enabled to perform the method performed by the first access network device, the second access network device, the first core network device, or the second core network device in the foregoing method embodiment.

This application further provides a system, including at least two of a first access network device, a second access network device, a first core network device, and a second core network device.

An embodiment of this application further provides a processing apparatus, including a processor and an interface. The processor is configured to perform the method performed by the first access network device, the second access network device, the first core network device, or the second core network device in any one of the foregoing method embodiments.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

Terms such as "component", "module", and "system" used in this specification are used to indicate a computer-related entity, hardware, firmware, a combination of hardware and software, software, or software being executed. For example, a component may be but is not limited to a process that runs on a processor, a processor, an object, an executable file, a thread of execution, a program, or a computer. As illustrated by using figures, both a computing device and an application that is run on the computing device may be components. One or more components may reside within a process or a thread of execution, and a component may be located on one computer or distributed between two or more computers. In addition, these components may be executed by various computer-readable media that store various data structures. For example, the components may communicate by using a local or remote process based on a signal having one or more data packets (for example, data from two components interacting with another component in a local system, in a distributed system, or across a network such as the internet interacting with another system by using the signal).

It should be understood that, an "embodiment" mentioned throughout this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments in any proper manner.

It should be understood that, in embodiments of this application, numbers "first", "second", and the like are merely used to distinguish between different objects, for example, to distinguish between different network devices, and do not constitute a limitation on the scope of embodiments of this application. Embodiments of this application are not limited thereto.

It should be further understood that, in this application, both "when" and "if" mean that a network element performs corresponding processing in an objective situation, but do not constitute a limitation on time, do not require that the network element have a determining action during implementation, and do not mean other limitations either.

It should be further understood that, in this application, "at least one" means one or more, and "a plurality of" means two or more.

It should be further understood that in embodiments of this application, "B corresponding to A" indicates that B is associated with A, and B may be determined based on A. However, it should be further understood that determining B based on A does not mean that B is determined based only on A. That is, B may alternatively be determined based on A and/or other information.

It should be further understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

Unless otherwise specified, an expression in this application similar to an expression that "an item includes one or more of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It may be understood that in embodiments of this application, the terminal device and/or the network device may perform some or all of the steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application may be necessarily to be performed.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiment. Details are not described herein again.

In the several embodiments provided in this application, it should be understood that the disclosed systems, apparatuses, and methods may be implemented in other manners. For example, the apparatus embodiments described above are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   sending, by a first core network device of a first core network, a handover request message to a first access network device, wherein the handover request message comprises an identity of a terminal device, and wherein a communications system comprises the first access network device and the first core network device;
   receiving, by the first access network device, the handover request message from the first core network device;
   determining, by the first access network device, that a secondary access network device to be added for the terminal device is a second access network device; and
   sending, by the first access network device to the second access network device, a request message for adding the second access network device as the secondary access network device of the terminal device, the request message comprising the identity of the terminal device; and
   wherein the first access network device is configured to provide the terminal device with a service for connecting to the first core network, and the second access network device is configured to, before serving as the secondary access network device for the terminal device, provide the terminal device with a service for connecting to a second core network.

2. The method according to claim 1, further comprising:
   sending, by the second access network device, a first message to a second core network device of the second core network, wherein the first message comprises the identity of the terminal device, and the first message is a request for the first access network device to allocate a resource to the terminal device, and wherein the communications system further comprises the second access network device and the second core network device;
   receiving, by the second core network device, the first message from the second access network device; and
   sending, by the second core network device to the first core network device, a second message comprising the identity of the terminal device.

3. The method according to claim 1, wherein the identity of the terminal device is an identity of the terminal device over an interface between the second access network device and a second core network device of the second core network.

4. The method according to claim 1, wherein the handover request message further comprises an identity of the second access network device.

5. The method according to claim 4, wherein the identity of the second access network device is an identity used when the second access network device provides the terminal device with the service for connecting to the second core network.

6. The method according to claim 5, further comprising:
receiving, by the first access network device, a first mapping relationship from the second access network device, wherein the first mapping relationship is between an identity used when the second access network device provides the terminal device with the service for connecting to the first core network and the identity used when the second access network device provides the terminal device with the service for connecting to the second core network; and
determining, by the first access network device based on the identity of the second access network device and the first mapping relationship, that the secondary access network device to be added for the terminal device is the second access network device.

7. The method according to claim 1, further comprising:
sending, by the second access network device to the first access network device, data corresponding to a bearer terminated at the first access network device.

8. The method according to claim 1, further comprising:
skipping, by the second access network device, forwarding of data that corresponds to a bearer terminated at the second access network device via any one of the first core network, the second core network, or the first access network device.

9. An apparatus for a first access network device, the apparatus comprising:
at least one processor and one or more memories coupled to the at least one processor, the one or more memories storing instructions for execution by the at least one processor to:
receive a handover request message from a first core network device of a first core network, wherein the handover request message comprises an identity of a terminal device;
determine that a secondary access network device to be added for the terminal device is a second access network device; and
send, to the second access network device, a request message for adding the second access network device as the secondary access network device of the terminal device, wherein the request message comprises the identity of the terminal device; and
wherein the first access network device is configured to provide the terminal device with a service for connecting to the first core network, and the second access network device is configured to, before serving as the secondary access network device of the terminal device, provide the terminal device with a service for connecting to a second core network.

10. The apparatus according to claim 9, wherein the identity of the terminal device is an identity of the terminal device over an interface between the second access network device and a second core network device of the second core network.

11. The apparatus according to claim 9, wherein the handover request message further comprises an identity of the second access network device.

12. The apparatus according to claim 11, wherein the identity of the second access network device is an identity used when the second access network device provides the terminal device with the service for connecting to the second core network.

13. The apparatus according to claim 12, wherein the instructions for execution by the at least one processor further include instructions to:
receive a first mapping relationship from the second access network device, wherein the first mapping relationship is a mapping relationship between an identity used when the second access network device provides the terminal device with the service for connecting to the first core network and the identity used when the second access network device provides the terminal device with the service for connecting to the second core network; and
determine, based on the identity of the second access network device and the first mapping relationship, that the secondary access network device to be added for the terminal device is the second access network device.

14. An apparatus for a second access network device, the apparatus comprising at least one processor and one or more memories coupled to the at least one processor, the one or more memories storing instructions for execution by the at least one processor to:
send a first message to a second core network device of a second core network, wherein the first message comprises an identity of a terminal device, and the first message requests a first access network device to allocate a resource to the terminal device; and
in response to a secondary access network device determined to be added for the terminal device being the second access network device, receive, from the first access network device, a request message for adding the second access network device as the secondary access network device of the terminal device, wherein the request message comprises the identity of the terminal device; and
wherein the first access network device is configured to provide the terminal device with a service for connecting to a first core network, and the second access network device is configured to, before serving as the secondary access network device of the terminal device, provide the terminal device with a service for connecting to the second core network.

15. The apparatus according to claim 14, wherein the identity of the terminal device is an identity of the terminal device over an interface between the second access network device and the second core network device.

16. The apparatus according to claim 14, wherein the first message further comprises an identity of the second access network device.

17. The apparatus according to claim 16, wherein the identity of the second access network device is an identity used when the second access network device provides the terminal device with the service for connecting to the second core network.

18. The apparatus according to claim 17, wherein the instructions for execution by the at least one processor further include instructions to:
send a first mapping relationship to the first access network device, wherein the first mapping relationship is a mapping relationship between an identity used when the second access network device provides the terminal device with the service for connecting to the first core network and the identity used when the second access network device provides the terminal device with the service for connecting to the second core network.

19. The apparatus according to claim 14, wherein the instructions for execution by the at least one processor further include instructions to:

send, to the first access network device, data corresponding to a bearer terminated at the first access network device.

20. The apparatus according to claim 14, wherein the instructions for execution by the at least one processor further include instructions to:

skip forwarding of data corresponding to a bearer terminated at the second access network device via any one of the first core network, the second core network, or the first access network device.

21. The apparatus according to claim 14, wherein the instructions for execution by the at least one processor further include instructions to:

map, based on a mapping relationship between a quality of service (QOS) flow and an evolved universal terrestrial radio access network radio access bearer (E-RAB), a data packet that is of a QoS flow and that is received from the second core network device to a data radio bearer (DRB) corresponding to an E-RAB applicable after handover, and send the data packet.

* * * * *